3,740,242
OPTICAL GLASSES
Marga Faulstich, Mainz, and Willy Ritze, Mainz-Monbach, Germany
Continuation of abandoned application Ser. No. 1,960, Jan. 12, 1970, which is a continuation of application Ser. No. 576,403, Aug. 31, 1966. This application Mar. 4, 1971, Ser. No. 121,167
Claims priority, application Germany, Sept. 4, 1965, J 28,924
Int. Cl. C03c 3/08, 3/10, 3/30
U.S. Cl. 106—54
22 Claims

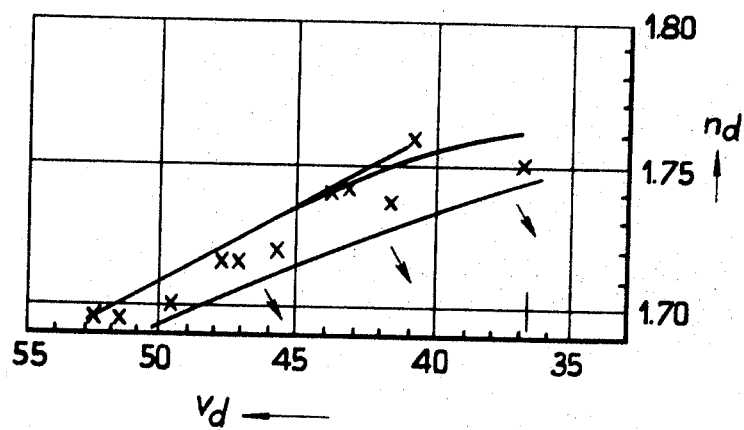

ABSTRACT OF THE DISCLOSURE

Thorium oxide and beryllium oxide-free glasses suitable to continuous melting and production having the following comparative values:

| Index of refraction: | Abbe value |
|---|---|
| $n_d$ 1.693 | $v_d$ 53 |
| $n_d$ 1.761 | $v_d$ 41 |
| $n_d$ 1.750 | $v_d$ 37 | and having a composition:

| | Weight percent |
|---|---|
| $SiO_2$ | 18.0–23.1 |
| $B_2O_3$ | 7.6–14.8 |
| $SiO_2+B_2O_3$ | 27.0–33.8 |
| BaO | 27.1–46.2 |
| $La_2O_3$ | 3.6–19.2 |
| $BaO+La_2O_3$ | 30.7–62.9 |
| CdO | 0.8–16.1 |
| $ZrO_2$ | 1.0–3.5 |
| $CdO+ZrO_2$ | 2.3–19.0 |

This application is a continuation of application Ser. No. 1,960, filed Jan. 12, 1970, which is a continuation of Ser. No. 576,403, filed Aug. 31, 1966 both of which are abandoned.

This invention relates to a novel class of optical glasses, and more particularly refers to such glasses which are stable against devitrification and are otherwise an improvement over glasses provided by the prior art.

It is known to produce optical glasses having various indices of refraction and Abbe values. It is further known to produce glasses having as the upper value of their refractive indices and Abbe values:

$$n_d\ 1.693 \quad v_d\ 53$$
$$n_d\ 1.761 \quad v_d\ 41$$
$$n_d\ 1.750 \quad v_d\ 37$$

These known glasses generally contain thorium oxide and/or beryllium oxide and, in fact, are often of the following compositions:

(a) Alkaline earth (preferably CaO)-lanthanum borates, silica-free or with a silica content equal to or less than 15 weight percent, the lanthanum oxide content being greater than 20 weight percent, plus additions of bivalent oxides such as ZnO, PbO and CdO 50 weight percent, plus stabilizing oxides such as $Al_2O_3$, $ZrO_2$, $TiO_2$, $Ta_2O_5$ and $WO_3$ in small quantities.

(b) Alkaline earth borates (preferably BaO)-lanthanum silicoborates, the lanthanum oxide content amounting to between 20 and 30 percent when the BaO content is less than 50 percent. A stabilization of these glasses against devitrification would be achieved either with 3 to 15 percent $ThO_2$ or with 2 to 15 percent BeO.

The above-listed compositions contain $B_2O_2$ and $SiO_2$ as glass formers, the percentages of boric acid by weight being greater and in a few cases practically equal to the $SiO_2$-content.

It will be obvious that it is desirable to eliminate thoria from glass compositions, since thoria is often a radioactive material. Further and similarly, it will be obviously desirable to remove beryllia from optical glass compositions, since beryllia is toxic, and therefore, a physiologically undesirable component.

It has been known in the past to produce thoria- and beryllia-free glasses having optical properties in the same general range as those indicated to be desirable therefor. These glasses generally have been prepared with a silica-content of at most about 15 percent. In the manufacture of these glasses, it has been found to be necessary to melt the compositions in platinum crucibles and to carry out the production of optical glass from these compositions in batch operations, since continuous or automatic production could not be accomplished without devitrification of the product.

It is therefore an object of this invention to provide a novel glass composition.

It is another object of this invention to provide a novel glass composition which can be produced continuously and/or automatically.

It is still a further object of this invention to provide a novel glass composition which is free from beryllia and thoria as essential components thereof.

Other and additional objects of this invention will become apparent from a consideration of this entire specification, including the claims appended hereto.

In accord with and fulfilling these objects, one aspect of this invention includes providing a glass composition having the following proportions of constituents:

| | Wt. percent |
|---|---|
| $SiO_2$ | 18–25 |
| $B_2O_3$ | 7–15 |
| $SiO_2+B_2O_3$ | 23–35 |
| BaO | 27–50 |
| $La_2O_3$ | 3–20 |
| $BaO+La_2O_3$ | 30–70 |
| CdO | 0.5–18 |
| $ZrO_2$ | 0.5–5 |
| $CdO+ZrO_2$ | 2–23 |

It is also possible to add up to 6 weight percent, preferably no more than 5 weight percent, of $TiO_2$ and/or $Ta_2O_5$ to the glasses, thereby improving the chemical stability and resistance to devitrification. The $TiO_2$-content should best amount to from 2 to 4 weight percent on account of a possibly undesirable yellow coloration. The addition of up to 1 weight percent of $Al_2O_3$ and/or $WO_3$ is also permissible.

With the use of the glass composition as stated above, it has been found that optical glasses are produced which are extremely stable against devitrification and are suitable for continuous and/or automatic production. The production may be of parisons and/or gobs, and further, the composition of this invention can be fused in relatively large quantity into shaped objects of high optical quality. It has been found that the glass of this invention has a viscosity of at least about 200 poises in its plastic condition during working of the parisons or gobs directly from the melt.

According to another aspect of this invention, it has been found practical to replace up to about 8 weight percent of the barium oxide, preferably up to about 5 weight percent of the barium oxide, with calcium oxide, strontium oxide, zinc oxide and/or up to about 2 weight percent magnesia. Thus, it may be practical to substitute a more inexpensive constituent or mixture of constituents for what has heretofore been considered to be an essential components.

Further, where the Abbe values are desirably less than 42, it is necessary to provide at least about 5 percent of lead oxide in the composition. Lead oxide can be present in proportions of up to about 18 percent, if desired.

Understanding of this invention will be facilitated by reference to the accompanying drawing which is a graphical representation of the physical properties of various glasses made according to this invention. In this drawing, the arrows indicate the area in which devitrification glasses can be made. The X's indicate various compositions within the scope of the invention which are similarly devitrification-resistant.

The following examples are given by way of illustration of this invention only, and should not be construed as being in any way limiting upon the scope thereof. All parts and percentages are by weight, unless specified to the contrary.

In the production of glass according to each of these examples, the following procedure was used:

Iron-free raw materials of the greatest possible purity are used for all optical glasses. The cationic oxide contents of each raw material are determined analytically before use. The weighed-out batch is mixed in a commercial-type mixer for 5 minutes. The well-mixed batch is set in a platinum crucible for about 6 hours at 1270° C., and then clarified at 1300° C. for 2.5 hours. The melt is homogenized by introducing an agitator into the melt and stirring it for about 75 minutes from 1280° C. to 1605° C. at 120 r.p.m. The melt can be cast at 1060° C. into block glass in a preheated pot mold, or fed as gobs or parisons to a corresponding blow table or parison mold table. The blocks or gobs or parisons are then cooled in a cooling oven from the 628° C. transformation temperature to room temperature as desired (20–0.5° C. per hr.). The melting process can be adapted without difficulty to continuous melting in a platinum tank.

EXAMPLE 1

In order to produce a glass having an index of refraction ($n_d$) of 1.744 and an Abbe value ($v_d$) of about 44, the following raw materials were used:

|  | G. |
|---|---|
| Silicic acid ($SiO_2$) | 7214 |
| Boric acid ($H_3BO_3$) | 6394 |
| Barium nitrate ($Ba(NO_3)_2$) | 26051 |
| Lead oxide ($Pb_3O_4$) | 205 |
| Zinc oxide (ZnO) | 901 |
| Cadmium oxide (CdO) | 2847 |
| Lanthanum oxide ($La_2O_3$) | 7059 |
| Zirconium oxide ($ZrO_2$) | 1324 |
| Titanium oxide ($TiO_2$) | 763 |
| Tantalum oxide ($Ta_2O_5$) | 642 |
| Tungsten oxide ($WO_3$) | 245 |
| Arsenic oxide ($As_2O$) | [1] 123 |

[1] As clarifier.

thus producing a charge for a 7-liter melt having the following proportions:

| Oxides: | Weight percent |
|---|---|
| $SiO_2$ | 18.0 |
| $B_2O_3$ | 9.0 |
| BaO | 38.1 |
| PbO | 0.5 |
| ZnO | 2.2 |
| CdO | 7.1 |
| $La_2O_3$ | 17.8 |
| $ZrO_2$ | 3.3 |
| $TiO_2$ | 1.9 |
| $Ta_2O_5$ | 1.5 |
| $WO_3$ | 0.3 |
| $As_2O_3$ | 0.3 |

In a similar manner, the compositions set forth in the following Table I have been formulated as optical glasses having the indices of refraction and Abbe values also indicated in Table I.

TABLE I

| Example No. | 2 | 3 | 4 | 5 | 6 | 7 | 8 | 9 | 10 | 11 | 12 | 13 | 14 |
|---|---|---|---|---|---|---|---|---|---|---|---|---|---|
| Oxide: | | | | | | | | | | | | | |
| $SiO_2$ | 21.4 | 19.0 | 20.1 | 21.0 | 20.2 | 21.6 | 19.3 | 23.1 | 18.0 | 18.7 | 22.1 | 22.4 | 18.9 |
| $B_2O_3$ | 11.0 | 14.8 | 12.9 | 9.9 | 11.1 | 11.3 | 9.2 | 9.2 | 9.0 | 10.4 | 8.9 | 7.6 | 9.1 |
| $Li_2O$ | 0.5 | | | | | | | | | | | | |
| CaO | 3.6 | | | | 0.7 | 1.1 | 1.6 | | | 1.1 | 1.8 | | 0.9 |
| BaO | 42.7 | 45.2 | 46.2 | 38.1 | 41.3 | 38.7 | 45.4 | 33.6 | 38.1 | 38.7 | 29.9 | 27.1 | 33.8 |
| PbO | | | 0.8 | | | | | 3.2 | | 0.5 | | 7.9 | 16.4 | 0.5 |
| ZnO | | 0.4 | 2.4 | 2.4 | 0.1 | 0.2 | 2.4 | 1.8 | 2.2 | | 2.4 | 2.2 | 1.2 |
| CdO | 4.9 | 1.3 | 2.6 | 6.8 | 1.1 | 0.8 | 1.6 | 16.1 | 7.1 | 1.0 | 12.7 | 14.3 | 3.6 |
| $Al_2O_3$ | | | | 0.1 | 0.1 | 0.1 | 0.1 | 0.1 | | | 0.1 | 0.1 | |
| $La_2O_3$ | 12.4 | 17.7 | 12.0 | 17.5 | 19.2 | 18.7 | 12.2 | 11.9 | 17.6 | 18.9 | 8.3 | 3.6 | 17.8 |
| $ZrO_2$ | 2.9 | 1.0 | 1.1 | 2.2 | 2.4 | 3.3 | 2.9 | 2.9 | 3.3 | 3.3 | 2.9 | 2.9 | 3.5 |
| $TiO_2$ | | | 1.5 | 1.4 | 2.3 | 2.2 | 1.5 | 1.0 | 1.9 | 4.3 | 2.4 | 2.8 | 5.9 |
| $Ta_2O_5$ | | | | | 0.8 | 1.3 | | | 1.5 | 2.8 | | | 4.0 |
| $WO_3$ | 0.3 | 0.3 | 0.1 | 0.3 | 0.4 | 0.4 | 0.4 | | 0.5 | 0.5 | 0.3 | 0.3 | 0.4 |
| $As_2O_3$ | 0.3 | 0.3 | 0.3 | 0.3 | 0.3 | 0.3 | 0.3 | 0.3 | 0.3 | 0.3 | 0.3 | 0.3 | 0. |
| $n_d$ | 1.6935 | 1.6935 | 1.700 | 1.717 | 1.717 | 1.717 | 1.720 | 1.720 | 1.744 | 1.743 | 1.735 | 1.750 | 1.764 |
| $v_d$ | 51.5 | 52.5 | 49.8 | 48.0 | 48.0 | 47.1 | 46.0 | 46.0 | 44.0 | 43.9 | 41.6 | 37.0 | 41.1 |

As is illustrated by the examples, the glass of the invention is thorium oxide and beryllium oxide-free optical glass which can be fabricated by continuous or automatic production without devitrification, consisting essentially of the following composition:

| | Weight percent |
|---|---|
| $SiO_2$ | 18–23.1 |
| $B_2O_3$ | 7.6–14.8 |
| $SiO_2+B_2O_3$ | 27–33.8 |
| BaO | 27.1–46.2 |
| $La_2O_3$ | 3.6–19.2 |
| $BaO+La_2O_3$ | 30.7–62.9 |
| CdO | 0.8–16.1 |
| $ZrO_2$ | 1.0–3.5 |
| $CdO+ZrO_2$ | 2.3–19.0 | and having $n_d$ and $v_d$ values plotting on a graph of $n_d$ against $v_d$ in the area bounded by:

| $n_d$ | $v_d$ |
|---|---|
| 1.761 | 41.0 |
| 1.750 | 37.0 |
| 1.700 | 49.8 |
| 1.6935 | 51.5 |
| 1.6935 | 52.5 |
| 1.744 | 44 |

What is claimed is:

1. Thorium oxide and beryllium oxide-free optical glass which can be fabricated by continuous or automatic production without devitrification, consisting essentially of the following composition:

| | Weight percent |
|---|---|
| $SiO_2$ | 18–23.1 |
| $B_2O_3$ | 7.6–14.8 |
| $SiO_2+B_2O_3$ | 27–33.8 |
| BaO | 27.1–46.2 |
| $La_2O_3$ | 3.6–19.2 |
| $BaO+La_2O_3$ | 30.7–62.9 |
| CdO | 0.8–16.1 |
| $ZrO_2$ | 1.0–3.5 |
| $CdO+ZrO_2$ | 2.3–19.0 | and having $n_d$ and $v_d$ values plotting on a graph of $n_d$ against $v_d$ in the area bounded by:

| $n_d$ | $v_d$ |
|---|---|
| 1.761 | 41.0 |
| 1.750 | 37.0 |
| 1.700 | 49.8 |
| 1.6935 | 51.5 |
| 1.6935 | 52.5 |
| 1.744 | 44 |

2. Optical glass as claimed in claim 1, containing additionally up to about 6 weight percent of a member of the group consisting of $TiO_2$ and $Ta_2O_5$ and mixtures thereof.

3. Optical glass as claimed in claim 2, containing up to about 5 weight percent of material of said group.

4. Optical glass as claimed in claim 1, containing in addition up to about 1 weight percent of a member selected from the group consisting of $Al_2O_3$ and $WO_3$ and mixtures thereof.

5. Optical glass as claimed in claim 1, wherein up to about 8 weight percent of said barium oxide is replaced by at least one member selected from the group consisting of CaO, SrO, ZnO and up to about 2 weight percent MgO.

6. Optical glass as claimed in claim 1, containing in addition up to about 18 weight percent PbO.

7. Optical glass as claimed in claim 6, wherein said lead oxide is present in a proportion of at least about 5 weight percent and the Abbe value is less than about 42.

8. Optical glass as claimed in claim 1, containing up to about 1 weight percent of at least one alkali metal oxide.

9. Optical glass as claimed in claim 1, having an index of refraction of 1.6935 and an Abbe value of about 51.5, which has the following composition:

| | | | |
|---|---|---|---|
| $SiO_2$ | 21.4 | CdO | 4.9 |
| $B_2O_3$ | 11.0 | $La_2O_3$ | 12.4 |
| $Li_2O$ | 0.5 | $ZrO_2$ | 2.9 |
| CaO | 3.6 | $WO_3$ | 0.3 |
| BaO | 42.7 | $As_2O_3$ | 0.3 |

10. Optical glass as claimed in claim 1, having an index of refraction of 1.717 and an Abbe value of about 48, which has the following composition:

| | | | |
|---|---|---|---|
| $SiO_2$ | 20.2 | $La_2O_3$ | 19.2 |
| $B_2O_3$ | 11.1 | $ZrO_2$ | 2.4 |
| CaO | 0.7 | $TiO_2$ | 2.3 |
| BaO | 41.3 | $Ta_2O_5$ | 0.8 |
| ZnO | 0.1 | $WO_3$ | 0.4 |
| CdO | 1.1 | $As_2O_3$ | 0.3 |
| $Al_2O_3$ | 0.1 | | |

11. Optical glass as claimed in claim 1, having an index of refraction of 1.750 and an Abbe value of about 46, which has the following composition:

| | | | |
|---|---|---|---|
| $SiO_2$ | 23.1 | $Al_2O_3$ | 0.1 |
| $B_2O_3$ | 9.2 | $La_2O_3$ | 11.9 |
| BaO | 33.6 | $ZrO_2$ | 2.9 |
| ZnO | 1.8 | $TiO_2$ | 1.0 |
| CdO | 16.1 | $As_2O_3$ | 0.3 |

12. Optical glass as claimed in claim 1, having an index of refraction of 1.744 and an Abbe value of about 44, which has the following composition:

| | | | |
|---|---|---|---|
| $SiO_2$ | 18.0 | $La_2O_3$ | 17.6 |
| $B_2O_3$ | 9.0 | $ZrO_2$ | 3.3 |
| BaO | 38.1 | $TiO_2$ | 1.9 |
| PbO | 0.5 | $Ta_2O_5$ | 1.5 |
| ZnO | 2.2 | $WO_3$ | 0.5 |
| CdO | 7.1 | $As_2O_3$ | 0.3 |

13. Optical glass as claimed in claim 1, having an index of refraction of 1.750 and an Abbe value of about 37, which has the following composition:

| | | | |
|---|---|---|---|
| $SiO_2$ | 22.4 | $Al_2O_3$ | 0.1 |
| $B_2O_3$ | 7.6 | $La_2O_3$ | 3.6 |
| BaO | 27.1 | $ZrO_2$ | 2.9 |
| PbO | 16.4 | $TiO_2$ | 2.8 |
| ZnO | 2.2 | $WO_3$ | 0.3 |
| CdO | 14.3 | $As_2O_3$ | 0.3 |

14. Optical glass as claimed in claim 1, having an index of refraction of 1.761 and an Abbe value of about 41, which has the following composition:

| | | | |
|---|---|---|---|
| $SiO_2$ | 18.9 | $La_2O_3$ | 17.8 |
| $B_2O_3$ | 9.1 | $ZrO_2$ | 3.5 |
| CaO | 0.9 | $TiO_2$ | 5.9 |
| BaO | 33.8 | $Ta_2O_5$ | 4.0 |
| PbO | 0.5 | $WO_3$ | 0.4 |
| ZnO | 1.2 | $As_2O_3$ | 0.4 |
| CdO | 3.6 | | |

15. Optical glass as claimed in claim 1, having an index of refraction of 1.6935 and an Abbe value of about 52.5, which has the following composition:

| | | | |
|---|---|---|---|
| $SiO_2$ | 19.0 | $La_2O_3$ | 17.7 |
| $B_2O_3$ | 14.8 | $ZrO_2$ | 1.0 |
| BaO | 45.2 | $WO_3$ | 0.3 |
| ZnO | 0.4 | $As_2O_3$ | 0.6 |
| CdO | 1.3 | | |

16. Optical glass as claimed in claim 1, having an index of refraction of 1.700 and an Abbe value of about 49.8, which has the following composition:

| | | | |
|---|---|---|---|
| $SiO_2$ | 20.1 | $La_2O_3$ | 12.0 |
| $B_2O_3$ | 12.9 | $ZrO_2$ | 1.1 |
| BaO | 46.2 | $TiO_2$ | 1.5 |
| PbO | 0.8 | $WO_3$ | 0.1 |
| ZnO | 2.4 | $As_2O_3$ | 0.3 |
| CdO | 2.6 | | |

17. Optical glass as claimed in claim 1, having an index of refraction of 1.717 and an Abbe value of about 48.0, which has the following composition:

| | | | |
|---|---|---|---|
| $SiO_2$ | 21.0 | $La_2O_3$ | 17.5 |
| $B_2O_3$ | 9.9 | $ZrO_2$ | 2.2 |
| BaO | 38.1 | $TiO_2$ | 1.4 |
| ZnO | 2.4 | $WO_3$ | 0.3 |
| CdO | 6.8 | $As_2O_3$ | 0.3 |
| $Al_2O_3$ | 0.1 | | |

18. Optical glass as claimed in claim 1, having an index of refraction of 1.717 and an Abbe value of about 47.1, which has the following composition:

| | | | |
|---|---|---|---|
| $SiO_2$ | 21.6 | $La_2O_3$ | 18.7 |
| $B_2O_3$ | 11.3 | $ZrO_2$ | 3.3 |
| CaO | 1.1 | $TiO_2$ | 2.2 |
| BaO | 38.7 | $Ta_2O_5$ | 1.3 |
| ZnO | 0.2 | $WO_3$ | 0.4 |
| CdO | 0.8 | $As_2O_3$ | 0.3 |
| $Al_2O_3$ | 0.1 | | |

19. Optical glass as claimed in claim 1, having an index of refraction of 1.720 and an Abbe value of about 46.0, which has the following composition:

| | | | |
|---|---|---|---|
| $SiO_2$ | 19.3 | $Al_2O_3$ | 0.1 |
| $B_2O_3$ | 9.2 | $La_2O_3$ | 12.2 |
| CaO | 1.6 | $ZrO_2$ | 2.9 |
| BaO | 45.4 | $TiO_2$ | 1.5 |
| PbO | 3.2 | $WO_3$ | 0.4 |
| ZnO | 2.4 | $As_2O_3$ | 0.3 |
| CdO | 1.6 | | |

20. Optical glass as claimed in claim 1, having an index of refraction of 1.743 and an Abbe value of about 43.9, which has the following composition:

| | | | |
|---|---|---|---|
| $SiO_2$ | 18.7 | $ZrO_2$ | 3.3 |
| $B_2O_3$ | 10.4 | $TiO_2$ | 4.3 |
| CaO | 1.1 | $Ta_2O_5$ | 2.8 |
| BaO | 38.7 | $WO_3$ | 0.5 |
| CdO | 1.0 | $As_2O_3$ | 0.3 |
| $La_2O_3$ | 18.9 | | |

21. Optical glass as claimed in claim 1, having an index of refraction of 1.735 and an Abbe value of about 41.6, which has the following composition:

| | | | |
|---|---|---|---|
| $SiO_2$ | 22.1 | $Al_2O_3$ | 0.1 |
| $B_2O_3$ | 8.9 | $La_2O_3$ | 8.3 |
| CaO | 1.8 | $ZrO_2$ | 2.9 |
| BaO | 29.9 | $TiO_2$ | 2.4 |
| PbO | 7.9 | $WO_3$ | 0.3 |
| ZnO | 2.4 | $As_2O_3$ | 0.3 |
| CdO | 12.7 | | |

22. Optical glass as claimed in claim 1, having an index of refraction of 1.744 and an Abbe value of about 44, which has the following composition:

| | | | |
|---|---|---|---|
| $SiO_2$ | 18.0 | $La_2O_3$ | 17.8 |
| $B_2O_3$ | 9.0 | $ZrO_2$ | 3.3 |
| BaO | 38.1 | $TiO_2$ | 1.9 |
| PbO | 0.5 | $Ta_2O_5$ | 1.5 |
| ZnO | 2.2 | $WO_3$ | 0.3 |
| CdO | 7.1 | $As_2O_3$ | 0.3 |

References Cited

UNITED STATES PATENTS

| | | | |
|---|---|---|---|
| 2,523,362 | 9/1950 | Fraser et al. | 106—54 |
| 2,678,281 | 5/1954 | Geffeken et al. | 106—47 X |
| 2,967,779 | 1/1961 | Izumitari | 106—54 |

FOREIGN PATENTS

| | | | |
|---|---|---|---|
| 686,708 | 1/1953 | Great Britain | 106—54 |
| 55,355 | 9/1943 | Netherlands | 106—54 |
| 1,047,994 | 12/1958 | Germany | 106—47 |

WINSTON A. DOUGLAS, Primary Examiner

M. L. BELL, Assistant Examiner

U.S. Cl. X.R.

106—47 Q, 53

UNITED STATES PATENT OFFICE
CERTIFICATE OF CORRECTION

Patent No. 3,740,242    Dated June 19, 1973

Inventor(s) Marga Faulstich et al.

It is certified that error appears in the above-identified patent and that said Letters Patent are hereby corrected as shown below:

Column 1, line 4, after "Germany" insert -- JENAer Glaswerk Schott & Gen., Mainz, Germany --. Column 4, Table I, "1.764" should read -- 1.761 --.

Signed and sealed this 19th day of February 1974.

(SEAL)
Attest:

EDWARD M. FLETCHER, JR.
Attesting Officer

C. MARSHALL DANN
Commissioner of Patents